Dec. 22, 1970  B. Z. R. ZACIOS  3,548,647
APPARATUS FOR PAPER TESTING
Filed June 26, 1967  3 Sheets-Sheet 2
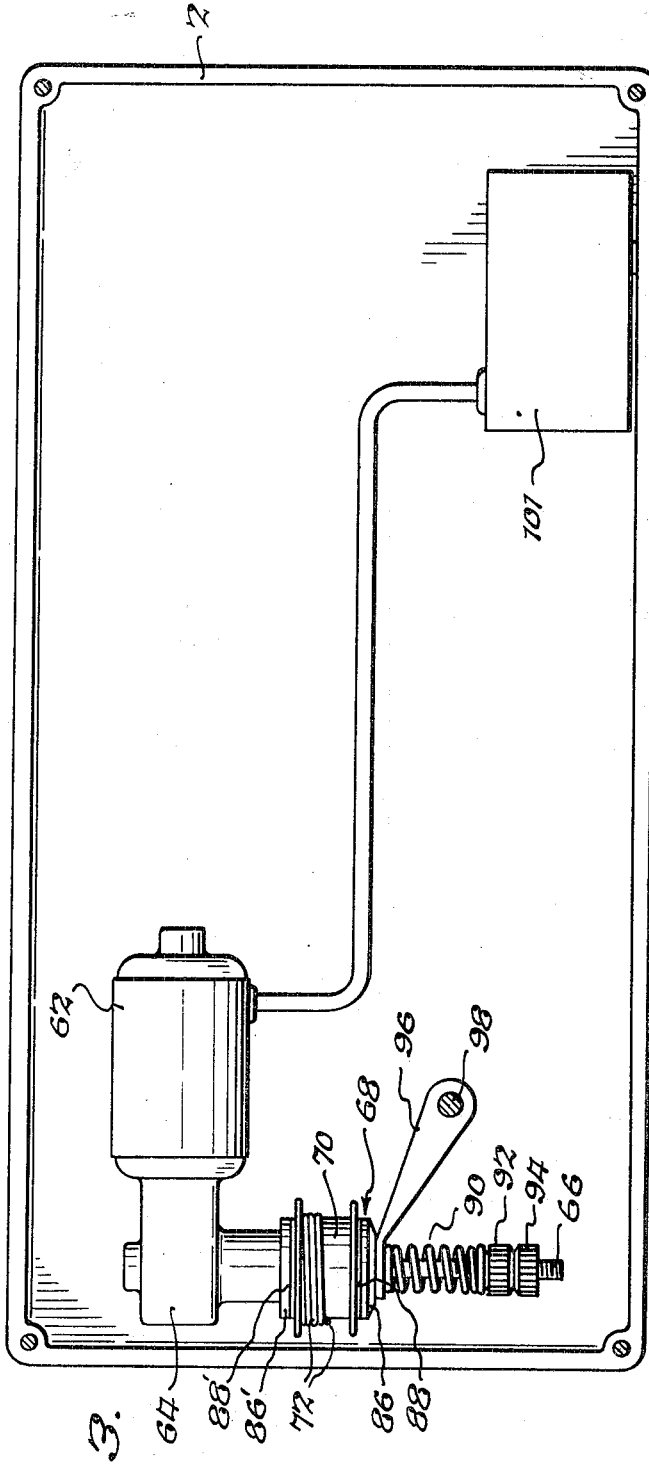
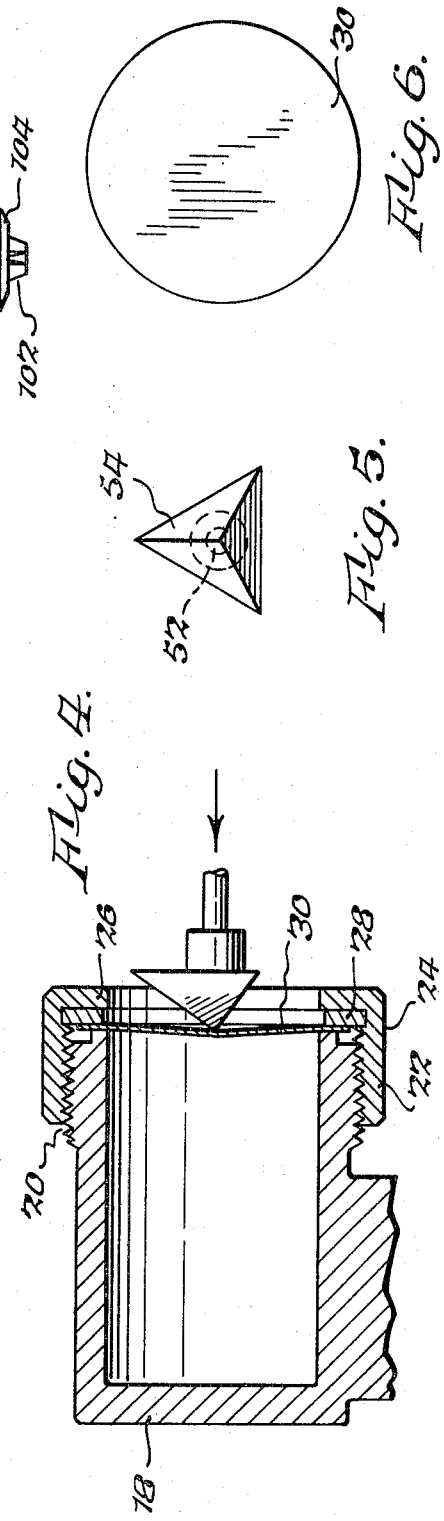
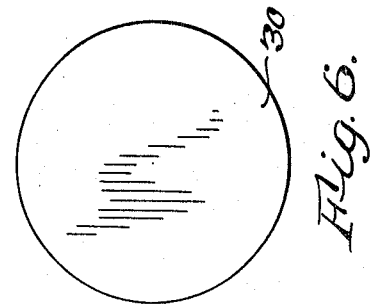

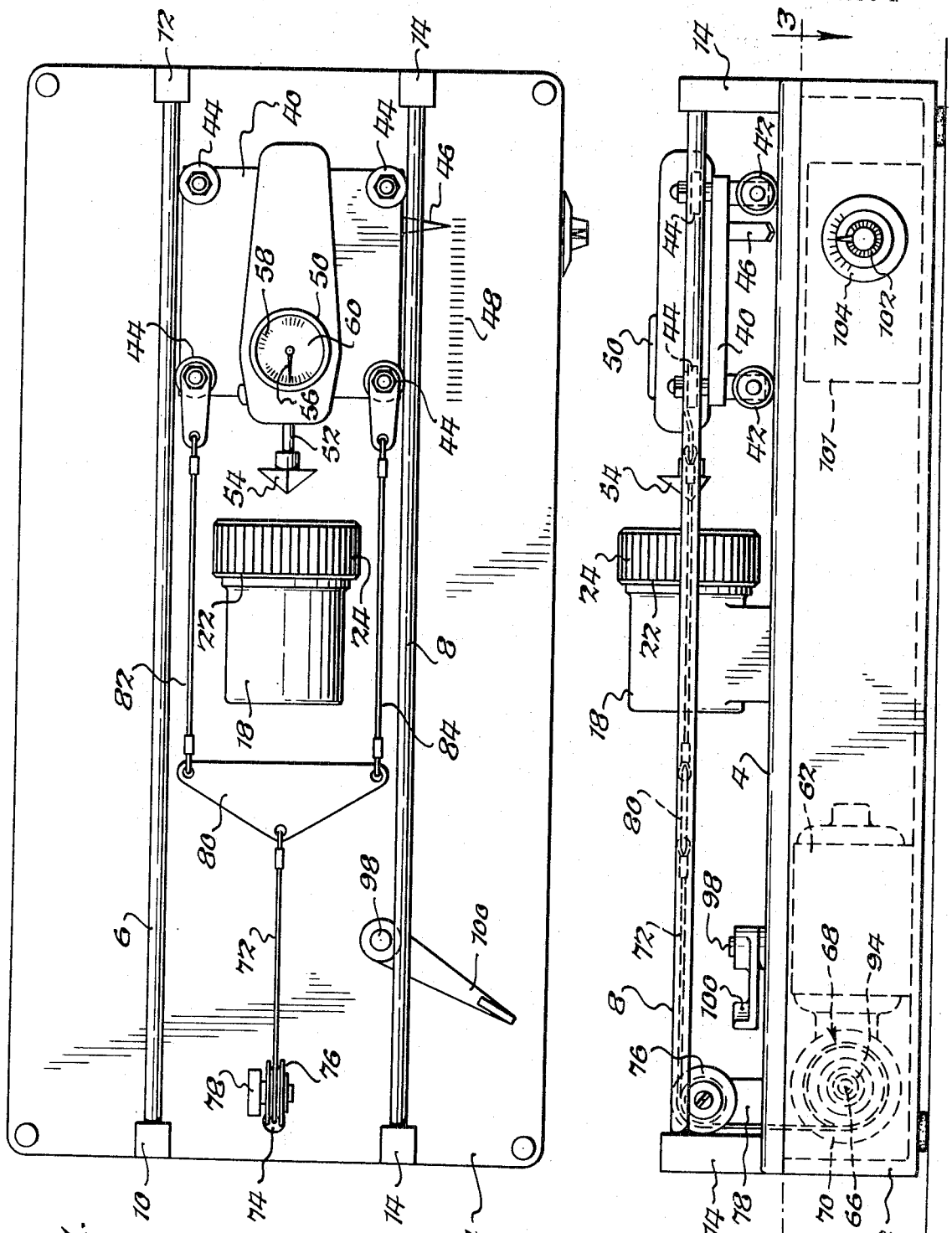

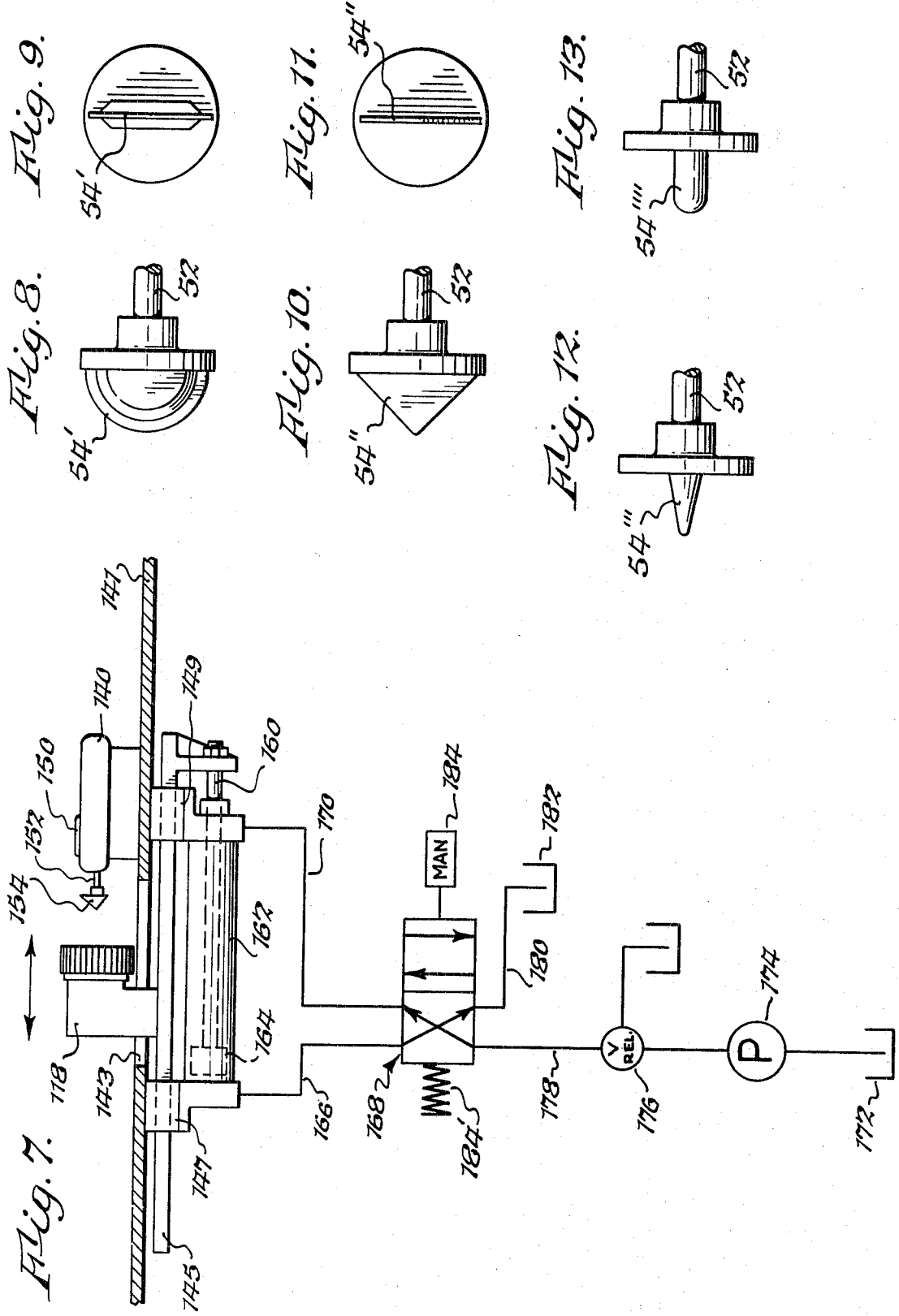

United States Patent Office 3,548,647
Patented Dec. 22, 1970

3,548,647
APPARATUS FOR PAPER TESTING
Boleslaw Zbigniew Robert Zacios, Montreal, Quebec, Canada, assignor to Canadian International Paper Company, Montreal, Quebec, Canada, a corporation of Quebec
Filed June 26, 1967, Ser. No. 648,852
Int. Cl. G01n 3/26
U.S. Cl. 73—102                                                   9 Claims

ABSTRACT OF THE DISCLOSURE

Apparatus for testing the puncture resistance of sheet material, especially kraft paper for grocery, shopping bags, and the like, that includes a holder for a paper specimen, a carriage, a force gauge on the carriage, a platen on the force gauge shaft and means for moving the holder and carriage relative to each other and for bringing the platen into contact with, and puncture, the specimen to record on the force gauge the force required for the platen to puncture the specimen.

---

This invention relates to apparatus for puncture testing sheet material and, more particularly, to apparatus for testing kraft paper for use in grocery bags, shopping bags, and the like.

It is common practice, in paper making, to test samples of the paper sheet, before the sheet is used for a particular purpose, to determine the suitability of the tested sheet for such purpose. If test results show that the paper is suited for such purpose, then the paper may be so used and, if not, the paper is usually used for some other purpose more suited to the test results.

Various test procedures and testing apparatus have, heretofore, been employed for testing paper samples and have been found satisfactory for determining the suitability of the paper sheet for many purposes. Recently, however, it has been discovered that established testing procedures and apparatus are not reliable to determine the suitability of light weight kraft paper for use in grocery bags, and the like. It has been discovered that sheets satisfactorily tested for tear strength in, for example, an Elmendorf Tear Tester, burst strength in, for example, a Mullen Tester, and strengths in other established paper testing equipment, were not satisfactory for grocery bags, shopping bags, and the like, and that such bags failed in service.

Although tear strength, burst strength, and other strength tests, are satisfactory for determining suitability of the paper for many purposes, such tests do not adequately test the puncture strength of the paper sheet which is the condition under which most grocery and shopping bags fail. When such bags are used, goods loaded into the bags may themselves be packaged in cans, boxes, and the like, the edges of which come into contact with the bag wall. The weight of other packages in such bag above such cans, or boxes, tend to force the edge through the bag wall. Once the edge is forced through, rupturing or puncturing the paper wall, the bag rapidly tears. This is because the resistance to such paper to a tear, once started, is much less than the resistance to the start of a tear. Even though the tear strength, i.e., resistance to progress of the tear, of the paper in the bag is relatively high, it is much less than the resistance of the paper to the initiation of the tear. Hence, when a rupture or puncture in the paper wall of such a bag does occur, the bag easily rips, spilling the bag contents.

One of the objects of the instant invention is to provide improved apparatus for testing light weight kraft paper for use in grocery and shopping bags.

A further object is to provide such apparatus in which paper samples may be tested and the suitability of the sampled paper for grocery and shopping bags determined.

Still a further object is to provide such apparatus that is simple, reliable and can be used by production personnel with minimum training and facilities.

These and other objectives will be more apparent from the following description and attached drawings in which:

FIG. 1 is a top plan view of the apparatus of the instant invention;

FIG. 2 is a side elevational view of the apparatus of FIG. 1;

FIG. 3 is an enlarged view similar to FIG. 1 but with the top removed to show the drive and control arrangement;

FIG. 4 is an enlarged view, partly in section, of the sample holder and platen of FIG. 1;

FIG. 5 is an enlarged end view of the platen of FIG. 1;

FIG. 6 is a plan view of a test specimen of the type to be tested;

FIG. 7 is a side elevational view, partly in section and partly in schematic diagram, showing a modification of the apparatus of FIG. 1;

FIG. 8 is a side elevational view of a modified platen;

FIG. 9 is an end view of the platen of FIG. 8;

FIG. 10 is a side elevational view of a further modified platen;

FIG. 11 is an end view of the platen of FIG. 10;

FIG. 12 is a side elevational view of a tapered cone platen; and

FIG. 13 is a side elevational view of a round nose cylindrical platen.

In the instant invention, a sample of the paper sheet to be tested is clamped in a holder and held in fixed position. A platen, having a leading end of a particular geometric shape, is driven from a measured distance, at an established speed, with a pre-established force, into engagement with the sample. The platen punctures the sample and the force on the platen required to puncture the sample is measured and recorded.

Referring now to FIGS. 1 and 2, the apparatus includes base 2, having fixed thereon plate 4. Guide bars 6, 8, are mounted in fixed, parallel spaced position above plate 2 and are mounted at their opposite ends above plate 4 on posts 10, 12 and 14, 16, respectively, forming, between bars 6, 8, a guideway for purposes later described.

Sample holder 18 is fixed to plate 4 and, at one of its ends, is threaded on its outer diameter, at 20 (FIG. 4), to receive samplee holder ring 22, knurled around its outer periphery at 24 so that ring 22 can be installed and removed by hand. Ring 22 has an inwardly extending shoulder 26 which, when the ring is installed and tightened on threads 20 of sample holder 18, engages bushing 28, clamping a circular sample of paper to be tested, 30 (FIGS. 4 and 6), between the end of sample holder 18 and bushing 28. When in place, sample 30 forms a diaphragm over the open end of sample holder 8, with the diaphragm facing toward the direction of the platen to be described.

Force gauge carriage 40 is mounted on anti-friction rollers 42, of which there are four, one at each corner of carriage 40, for rolling movement along plate 4 between guide bars 6, 8. Anti-friction rollers 44, of which there are four, one at each corner of carriage 40, are in rolling contact with guide bars 6, 8. Pointer 46, fixed to carriage 40, registers with scale 48 on plate 4 for indicating the length of travel of carriage 40 for purposes to be described later.

Force gauge 50, of conventional construction, is mounted in fixed position on carriage 40 with shaft 52 of gauge 50 projecting forwardly of the housing in the direction of, and toward, the sample holding end of sample holder 18. Platen 54 is fixed to the end of gauge shaft 52. Pointer 56 of gauge 50 is rotated, by conventional mechanism, not shown, when a force is applied to platen 54 and shaft 52, and rotates relative to scale 58 on dial 60. Preferably, force gauge 50 is of the type having a second pointer, mounted tandem to pointer 56. The second pointer rotates with pointer 56, when force is applied to the gauge, and the second pointer remains at the highest recorded force until reset. Force gauges with such tandem pointers, are conventional.

Referring now to FIGS. 1, 2 and 3, force gauge carriage 40 is driven by variable speed motor 62 which, through gear reduced 64, shaft 66 and friction clutch, generally designated 68, drives cable drum 70. Cable 72 is wound, from one of its ends, on drum 70 and extends upward through opening 74 in plate 4, over pulley 76, mounted for rotation on post 78 fixed to plate 4, and is connected, at its opposite end, to the center of whiffletree 80. Whiffletree 80 is connected, at its opposite ends, by cables 82, 84, to carriage 40.

Referring to FIG. 3, friction clutch 68 includes a driven member 86, splined to driven shaft 66 of motor 62 and gear reducer 64 which, when the clutch is engaged, is held in engagement with clutch surface 88 on the end of cable drum 70. Cable drum 70 is rotatably supported on shaft 66 but, when clutch 68 is disengaged is free for relative rotation with respect to shaft 66.

When engaged, clutch driven member 86 is held in frictional engagement with clutch surface 88 by compression spring 90, the compression of spring 90 being adjusted by lock nuts 92, 94, threaded on the end of driven shaft 66. Clutch driven member 86 is brought into, and out of, engagement with clutch surface 88 by clutch lever 96 connected to one end of shaft 98 rotatably supported in plate 4. Shaft 98 is connected, at its opposite end, above plate 4, to control lever 100.

Referring to FIG. 3, motor 62 is connected to, and the speed is controlled by, speed control 101, the speed setting of speed control 101, being regulated by the manual setting of knob 102 on scale 104 of base 2 (FIG. 2). The setting of the pointer of knob 102 on scale 104 shows the speed setting of speed control 101 and motor 62.

Platen 54 may be of any geometrical shape deemed suited and desirable for the tests. Platen 54 may be, as shown in FIGS. 1, 2, 4, 5, a tetrahedron; an arcuate disk, shown as 54' in FIGS. 8, 9; a triangular disk shown as 54'' in FIGS. 10, 11; a tapered cone, shown as 54''' in FIG. 12; or, a round nose cylinder, shown as 54'''' in FIG. 13.

In operation of the apparatus of FIGS. 1, 2, 3, 4, a platen of the desired shape is fixed to the end of shaft 52 of force gauge 50. A circular specimen 30, of about five square inches, is cut from the sheet to be tested and, with ring 22 and bushing 28 removed, is positioned over the open end of sample holder 18. Bushing 28 and ring 22 are then installed on sample holder 18 and ring 22 is tightened, by hand, on the threads 20 of holder 18 until sample 30 is tightly gripped between the end of holder 18 and bushing 28.

With motor 62 running, speed control 101 is set for the desired driving speed by manually adjusting knob 102 on scale 104. As this adjustment is made, clutch lever 100 is in the clutch release position, friction clutch 68 is out of engagement with clutch surface 88, and cable drum 70 is not being driven.

Force gauge carriage 40 is then moved away from sample holder, to the right in FIGS. 1 and 2, until pointer 46 on carriage 40 is at the pre-determined position on scale 48. Force gauge 50 is adjusted so that pointer 56 and the second tandem pointer which, for purposes of convenience is hereinafter referred to as the "maximum force pointer," are both at zero on scale 58 of dial 60.

Clutch control lever 100 is then turned to the clutch engaged position and friction clutch 68 is brought into driving engagement with clutch surface 88 to drive cable drum 70.

As cable drum 70 rotates, cable 72 is reeled onto drum 70 and, through whiffletree 80 and cables 82, 84 drives carriage 40, force gauge 50 and platen 54 toward specimen 30, i.e., toward the left in FIGS. 2 and 3. Carriage 40 is driven at constant speed and, as platen 54 comes into contact with specimen 30, at the center of the specimen, the resistance of the specimen to puncture by the platen results in a force measurement on dial 60 of force gauge 50. Thus, as the specimen is punctured, maximum force pointer is rotated on the scale and remains at the maximum position after the specimen is punctured.

After specimen 30 is punctured, the operator disengages clutch 68 by positioning control level 100 in the clutch disengaged position and reads, records and re-sets the maximum force pointer. Should the operator fail to disengage the clutch, and carriage 40 comes into contact with holder 18 after specimen 30 has been punctured, clutch 68 will slip until disengaged by the operator. Obviously, control lever 100 may be so positioned on plate 4 so that, after carriage 40 has punctured specimen 30, carriage 40, whiffletree 80, an attachment on cable 72, 82, 84 or other means on the moving parts of the apparatus, engage control lever 100 to disengage clutch 68.

In the foregoing embodiment, sample holder 18 is stationary and carriage 40, with force gauge 50, is movable. Obviously, of course, carriage 40 and force gauge 50 may be stationary and sample holder 18 may be movable. Such embodiment is shown in FIG. 7 wherein carriage 140 is mounted in fixed position on plate 141. Force gauge 150, having shaft 152 is mounted on carriage 140 and platen 154 is fixed to the projecting end of force gauge shaft 152. Sample holder 118 is mounted for reciprocal movement toward and away from carriage 140 in slot 143 of plate 141 and is mounted in fixed position on plate 145 supported for reciprocal movement in guides 147, 149 fixed to the bottom of plate 141 at the opposite ends of slot 143. Plate 145 is connected to piston rod shaft 160 of hydraulic cylinder 162. Piston rod shaft 160, at its opposite end, is connected to piston 164.

One end of hydraulic cylinder 162, at one side of piston 164, is connected by hydraulic line 166 to manual control valve 168 and the other end of cylinder 162, at the opposite side at piston 164, is connected by hydraulic line 170 to valve 168. Fluid is supplied under pressure to valve 168 from reservoir 172 and pump 174 through relief valve 176 and hydraulic line 178. Fluid is discharged from valve 168 through hydraulic line 180 into sump 182. Valve 168 is manually controlled by push button 184.

The operation of the embodiment of FIG. 7 is similar to the operation of the embodiment in FIGS. 1, 2 and 3. A platen of the desired shape is fixed to the end of shaft 152 of force gauge 150 and a circular specimen 30, of about 5 square inches, is cut from the sheet to be tested and clamped in sample holder 118 in the manner hereinbefore described. When the specimen is positioned in sample holder 118, the sample holder is in the left hand position, as shown in FIG. 7. The maximum force pointer and pointer 56 on force gauge 150 are at the zero position on the scale of force gauge 150. Button 184 is then pushed by the operator to deliver fluid, under pressure from pump 174, through valve 168 and hydraulic line 166 to cylinder 162 and the other end of cylinder 162 is connected through line 170, valve 168 and line 180 to sump 182. Sample holder 118 is moved by plate 145 to the right, in FIG. 7, bringing sample 30 in holder 118 into engagement with platen 154 and, as platen 154 punctures specimen 30, the force required to puncture the sample is indicated on the maximum force pointer of force gauge 150. After the specimen has been punctured and the force measured and recorded, the maximum force pointer is reset and holder 118 is returned to its initial position by repositioning valve 168 with manual button 184.

The apparatus of the instant invention can be used to test the puncture strength or resistance of a wide variety of sheet materials but has been found to be particularly suited for the testing of sheet materials for kraft paper grocery and shopping bags. In testing such bags a force gauge having a range of from .5 to 5 lbs., with a maximum force pointer, has been found to be particularly suited for testing kraft paper ranging in weight from approximately 30 to approximately 100 lbs. per 3,000 square feet.

The apparatus of the instant invention measures the force required to puncture the specimen or to initiate a tear in the specimen. This force is substantially higher than the force required to continue a tear and is more indicative of the suitability of the sheet tested for grocery and shopping bags than tests heretofore employed. The procedure and the apparatus provides a relatively inexpensive test which can be readily performed with minimum specimens.

In addition, the apparatus of the instant invention can be used, with a blade platen, such as arcuate disk 54' of FIGS. 8, 9 or triangular disk 54" of FIGS. 10, 11, to determine the direction of orientation of the fibers in a paper sheet, sometimes referred to as the "directionality" of the sheet. When so used, a plurality of circular samples 30, of the sheet to be tested, are cut from the sheet and marked, in a convenient manner, so that, after testing, the direction of each sample can be correlated with the direction of the paper sheet from which the samples were cut.

The samples 30 are, one after the other, installed on sample holder 18, tested in the same manner as described in puncture testing, and the force required for the blade platen to slit the sample is indicated on the maximum force pointer of force gauge 150 and is then recorded. Each sample is installed, on sample holder 18, with the marking on the sheet progressively rotated so that, after all of the samples have been tested, the forces required to slit the samples in all directions can be compared. Because, the force required to slit the paper sheet transverse the direction of orientation of the fibers is greater than the required force in the direction parallel to the fibers, the sample showing the highest force required to slit the sample, and the sample showing the lowest force, can be oriented to the sheet and the directionality of the sheet is, thus, determined.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. Apparatus for measuring strength of sheet material comprising a plate, a specimen holder mounted on said plate, means for clamping a specimen of sheet material to be tested on said holder, a carriage mounted on said plate, a force gauge mounted on said carriage, said force gauge having a force measuring dial and a force transmitting shaft connected to said dial and being mounted on said carriage with said shaft extending outwardly from said carriage toward said specimen clamped on said holder, a platen fixed to the projecting end of said shaft and means for moving said holder and said carriage relative to each other for advancing said platen into contact with and for puncturing said specimen with said platen and for measuring on said force gauge the force required by said platen to puncture said specimen.

2. Apparatus as recited in claim 1 in which said holder is fixed to said plate and said means for moving said holder and said carriage relative to each other is connected to said carriage and includes a variable speed motor, a clutch, a drum and a cable connected at one of its ends to said drum and, at its other end to said carriage, and means for engaging said clutch for driving said drum and advancing said platen into contact with and puncturing said specimen and means and disengaging said clutch and said drum.

3. Apparatus as recited in claim 2 in which said moving means includes a control for varying the speed of said motor.

4. Apparatus as recited in claim 3 in which said plate has a guideway and said carriage moves on said plate in said guideway.

5. Apparatus as recited in claim 4 in which there are means on said plate and said carriage for indicating the relative position of said specimen holder and said carriage.

6. Apparatus as recited in claim 5 in which said means for indicating relative position includes a scale on said plate and a pointer on said carriage.

7. Apparatus as recited in claim 1 in which said carriage is fixed to said plate and said means for moving said holder and said carriage relative to each other is connected to said holder.

8. Apparatus as recited in claim 7 in which said moving means includes a hydraulic cylinder on piston.

9. Apparatus as recited in claim 8 in which said hydraulic cylinder is fixed to said plate and said piston is connected to said holder.

References Cited

UNITED STATES PATENTS

| | | | |
|---|---|---|---|
| 1,709,638 | 4/1929 | Tnuing | 73—102 |
| 2,826,063 | 3/1958 | Astley | 73—102 |
| 3,289,470 | 12/1966 | Hubin | 73—102 |

REUBEN FRIEDMAN, Primary Examiner

T. A. GRANGER, Assistant Examiner

U.S. Cl. X.R.

162—263